UNITED STATES PATENT OFFICE

ARTHUR M. BUSWELL, OF URBANA, ILLINOIS

METHOD OF TREATING GELATINOUS AND COLLOIDAL MATERIALS

No Drawing.  Application filed February 4, 1927. Serial No. 166,023.

This invention relates to a process of treating gelatinous and colloidal materials, sludges and the like, with metallic salts, such as aluminum halides, for the purpose of rendering possible or more easy the separation of the liquid portion from said materials.

In modern sewage disposal plants, large quantities of sludge, or "activated" sludge, as it is called, are produced. In order to utilize such sludge economically, it is very desirable to obtain the sludge in a dry or semi-dry form or cake. This necessitates the removal of the liquid portion, or a large proportion thereof, from the sludge. But the sludge being of a gelatinous or colloidal nature, it is practically impossible to filter the same without some preliminary treatment whereby the colloidal nature of the sludge is broken down. Treatment of the sludge with aluminum sulphate has been proposed and has been found in some measure to be successful.

I have now found that other metallic salts are more efficient for this purpose. If an aluminum halide, or more particularly aluminum chloride, is added to the sewage sludge, or activated sludge, the colloidal character of the sludge is largely destroyed. Subsequent separation of the liquid portion, as by precipitation and decantation, or by filtration, is thereby rendered both possible and feasible. It is thus possible to produce a cake from material which has heretofore been found non-filterable, or it is possible to produce a drier cake and in shorter time than heretofore.

The comparative results of treating 100 c. c. portions of activated sludge with aluminum sulphate and aluminum chloride in amounts indicated and filtering the so treated sludge through filter paper in Buchner funnels are tabulated as follows:

| Aluminum chloride or aluminum Sulphate amount in lbs. Al$^{+++}$ per 1000 gals. sludge | Volume of filtrate in 30 minutes c. c. | |
|---|---|---|
|  | AlCl$_3$ | Al$_2$(SO$_4$)$_3$ |
| ½ | 24 |  |
| 1 | 63 | 37 |
| 1½ | 82 |  |
| 2 |  | 57 |
| 3 |  | 60 |

It is thus apparent that the treatment of the sludge with aluminum chloride is much more effective than a similar treatment with aluminum sulphate. This is probably due to the fact that the chloride ion has less tendency to flocculate or salt out colloidal aluminum hydroxide than the sulphate ion, it being understood, of course, that the removal of more of the free aluminum ion (Al$^{+++}$) from the solution correspondingly lessens in a marked degree the efficiency of the dehydrating action on the colloidal particles. In fact, whereas precipitation of aluminum hydroxide from a solution of aluminum sulphate takes place where the pH value of the solution lies between 5.5 and 6.0, similar precipitation of aluminum hydroxide from a solution of aluminum chloride does not take place until a pH of about 8 is reached. In other words, the chloride ion inhibits the formation of aluminum hydroxide, or other basic aluminum compounds, in solutions having a pH range of between 3.5 and 9, whereas within the same pH range the sulphate ion furthers the formation of aluminum hydroxide. Consequently, in the treatment of activated sludge, which, in general, has a pH range of between 6.5 and 8.5, there is less loss of efficiency through precipitation of aluminum hydroxide, or other basic compound of aluminum, when aluminum chloride is used than when aluminum sulphate is employed.

In place of aluminum chloride, aluminum fluoride or other tri valent metallic halides, such as ferric chloride, may be used with similarly satisfactory results.

While the invention has been described in connection with the treatment of sewage sludge, it will be appreciated that the process is equally applicable for coagulating, de-watering or "salting out" other gels and gelatinous precipitates where the pH range during treatment lies between 3.5 and 9.0.

I am aware that many changes may be made and numerous details of the process may be varied through a wide range without departing from the principles of this invention and I, therefore, do not purpose limiting the patent granted hereon, otherwise than necessitated by the prior art.

I claim as my invention:

1. In the process of removing a large proportion of the liquid portion from the solids of activated sludge, the steps of adding to the sludge an effective quantity of aluminum chloride to break down the colloidal nature of the solids and filtering the sludge while containing some of said dissolved aluminum chloride.

2. In the process of de-watering activated sludge, the steps which comprise dissolving from ½ to 1½ lbs. of aluminum chloride in each 1000 gals. of sludge to be treated and filtering said sludge in the presence of some of said dissolved aluminum chloride.

In testimony whereof I have hereunto subscribed my name.

ARTHUR M. BUSWELL.